United States Patent [19]

Smith et al.

[11] Patent Number: 5,357,078
[45] Date of Patent: Oct. 18, 1994

[54] PRECISION LINEAR VARIABLE CURRENT CONTROL

[75] Inventors: Leonard S. Smith, Minneapolis; Gary L. Cook, Eagan, both of Minn.

[73] Assignee: Snap-on Incorporated, Kenosha, Wis.

[21] Appl. No.: 992,154

[22] Filed: Dec. 17, 1992

[51] Int. Cl.5 .............................................. B23K 9/09
[52] U.S. Cl. ............................................. 219/130.51
[58] Field of Search ...................... 219/130.51, 137 PS

[56] References Cited

U.S. PATENT DOCUMENTS

| | | |
|---|---|---|
| 3,902,037 | 8/1975 | Goto et al. . |
| 4,301,355 | 11/1981 | Kimbrough et al. ........... 219/130.51 |
| 4,409,465 | 10/1983 | Yamamoto et al. . |
| 4,518,844 | 5/1985 | Needham . |
| 4,523,077 | 6/1985 | Hoyt, Jr. et al. . |
| 4,544,826 | 10/1985 | Nakanishi et al. . |
| 4,620,082 | 10/1986 | Graville et al. . |
| 4,716,274 | 12/1987 | Gilliland . |
| 4,742,208 | 5/1988 | Overman . |
| 4,767,912 | 8/1988 | Eldridge . |
| 4,785,149 | 11/1988 | Gilliland . |
| 4,947,021 | 8/1990 | Stava . |
| 4,972,064 | 11/1990 | Stava . |
| 5,001,326 | 3/1991 | Stava . |
| 5,057,665 | 10/1991 | Gilliland . |
| 5,063,282 | 11/1991 | Gilliland . |
| 5,073,695 | 12/1991 | Gilliland . |

FOREIGN PATENT DOCUMENTS

| | | | |
|---|---|---|---|
| 61-279366 | 12/1986 | Japan ............................ | 219/130.51 |
| 521089 | 9/1976 | U.S.S.R. ........................ | 219/130.51 |

OTHER PUBLICATIONS

Snap-on Tools Corporation Owner's Manual for YA204C MIG Combination Unit.
Snap-on Tools Corporation Operators Guide and Instruction Manual for YA217 Professional Tote MIG.

*Primary Examiner*—Clifford C. Shaw
*Attorney, Agent, or Firm*—Emrich & Dithmar

[57] ABSTRACT

A power supply for a consumable electrode arc welding system includes a power transformer adapted to be coupled to an AC source and having a rectified secondary coupled through a series inductor to the electrode. The rectified current is chopped by a MOSFET switch array controlled by a relatively high frequency pulse width modulator having a selectively variable pulse width to supply a pulsed unidirectional current flow to the welding gun. A bridge rectifier is connected across an auxiliary winding of the transformer to provide a supply voltage to the modulator.

20 Claims, 2 Drawing Sheets

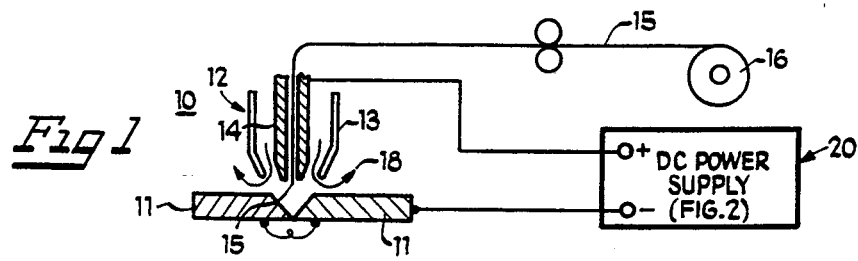
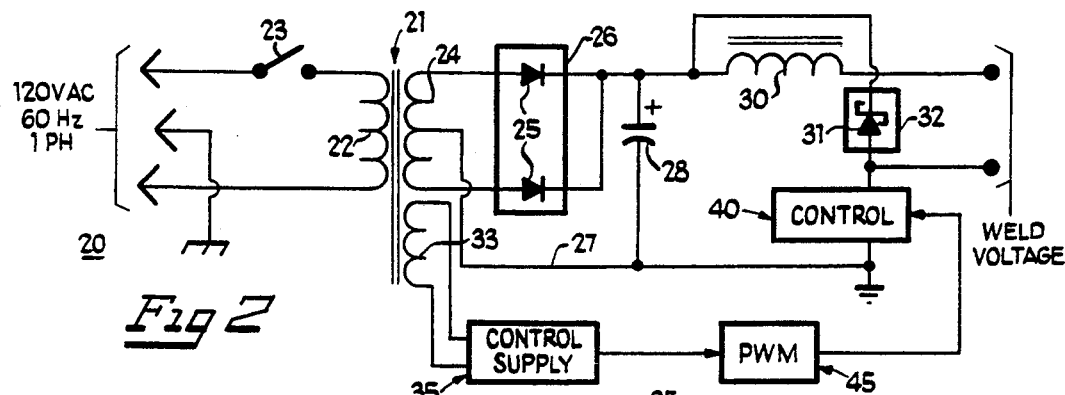
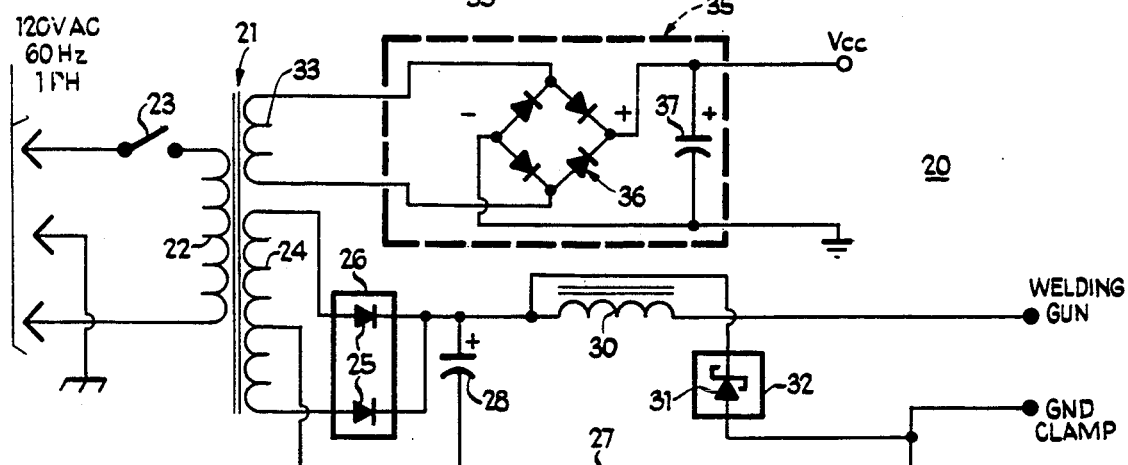
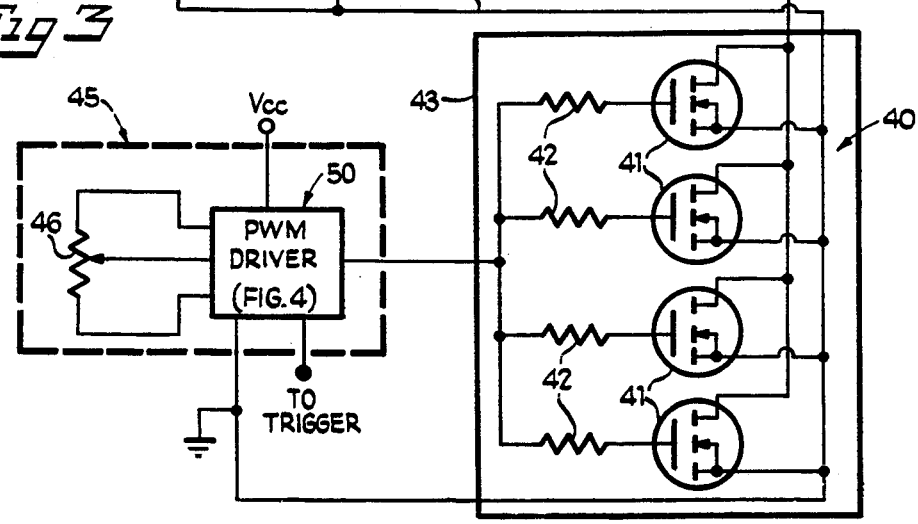

PRECISION LINEAR VARIABLE CURRENT CONTROL

BACKGROUND OF THE INVENTION

1. Field of the Invention

The present invention relates to power supplies for providing precision control of high DC welding currents. The invention relates, in particular, to power supplies for consumable electrode arc welding.

2. Description of the Prior Art

DC welding machines are used in many types of electric arc welding. One common type of DC power supply for such welding machines is the transformer-rectifier type, which utilizes a step-down voltage transformer coupled to an AC supply, with a rectifier connected in the transformer secondary. This type of power supply is used with various consumable electrode arc welding systems, such as metal inert gas ("MIG"). Various methods have beer used to adjust or control the welding current in such a power supply. Typically, control is exercised in the transformer primary, such as by the use of a tapped primary or by primary phase control, to vary the secondary voltage and current. This is done because of the problems encountered in attempting to control the high welding current of the transformer secondary circuit directly. But a tapped transformer winding provides only a step-type control and does not afford continuous adjustment. In primary phase control, the control is continuous but the adjustment is based on the sine wave AC input to the transformer, and the slope of the sine wave is usable only over about one-third of a cycle. Thus, the adjustment provided is non-linear, and is not smooth.

Furthermore, both of these types of transformer primary control also affect the available peak voltage. Thus, in applications such as the welding of thin metals where the power output has to be lowered to prevent burn-through of the workpiece, this also lowers the output voltage available to initially strike the arc, which may create weld problems in the case of poor conductors or dirty metal. Furthermore, the welding control is effected on a 60 Hz AC supply voltage, the frequency of which is low enough that the arc, once struck, can follow the 60 Hz variations and may tend to sputter or quench.

Also, with transformer primary control, the primary is connected to the AC supply only when the welding gun trigger is actuated, but the trigger actuation will be effective only if the trigger mechanism is supplied with power. This requires the use of a control transformer in addition to the power transformer and a contactor or relay responsive to trigger actuation for connecting the primary to the AC supply.

It is known to provide a tapped winding or phase control of the secondary of the power transformer, but the tapped winding still provides a stepped discontinuous control and the phase control is still operating on a sinusoidal waveform and provides a non-linear output with a very small and critical range of adjustment. Furthermore, the tendency to sputtering and quenching remains. Also, such secondary control techniques retain the disadvantage of affecting the peak voltage available.

With respect to the latter problem, some prior welding machines have utilized high frequency control characteristics in the primary of the transformer at a frequency too high for the arc to follow. However, such machines are extremely expensive, since the magnetic components and all of the semiconductors, especially the power semiconductors, must be able to function at the high frequency rate.

SUMMARY OF THE INVENTION

It is a general object of the invention to provide an improved precision high current DC power supply which avoids the disadvantages of prior supplies while affording additional structural and operating advantages.

An important feature of the invention is the provision of a power supply for providing a DC welding current in a consumable electrode arc welding system, which provides effective power control without affecting the peak voltage available.

Another feature of the invention is the provision of a power supply of the type set forth, which eliminates arc quenching at low welding currents.

Still another feature of the invention is the provision of a power supply of the type set forth which provides for linear continuous control of the welding current.

A still further feature of the invention is the provision of a power supply of the type set forth which allows the use of standard low cost components.

Another feature of the invention is the provision of a power supply of the type set forth which permits optimization of welding arc characteristics for different welding conditions.

These and other features of the invention are attained by providing a power supply for causing a pulsed unidirectional current to flow to a load, the power supply comprising: a power transformer having a primary winding adapted for connection to a source of AC power and a secondary winding, rectifying means coupled to the secondary winding for producing a DC current, and modulating means coupled between the rectifying means and the electrode for pulse width modulating the DC current to produce the pulsed unidirectional current.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a diagrammatic illustration of a MIG welding system including a DC power supply;

FIG. 2 is a partially block and partially schematic circuit diagram of the power supply of FIG. 1, in accordance with the present invention;

FIG. 3 is a more detailed circuit diagram of the power supply of FIG. 2;

DESCRIPTION OF THE PREFERRED EMBODIMENT

Figure 4:
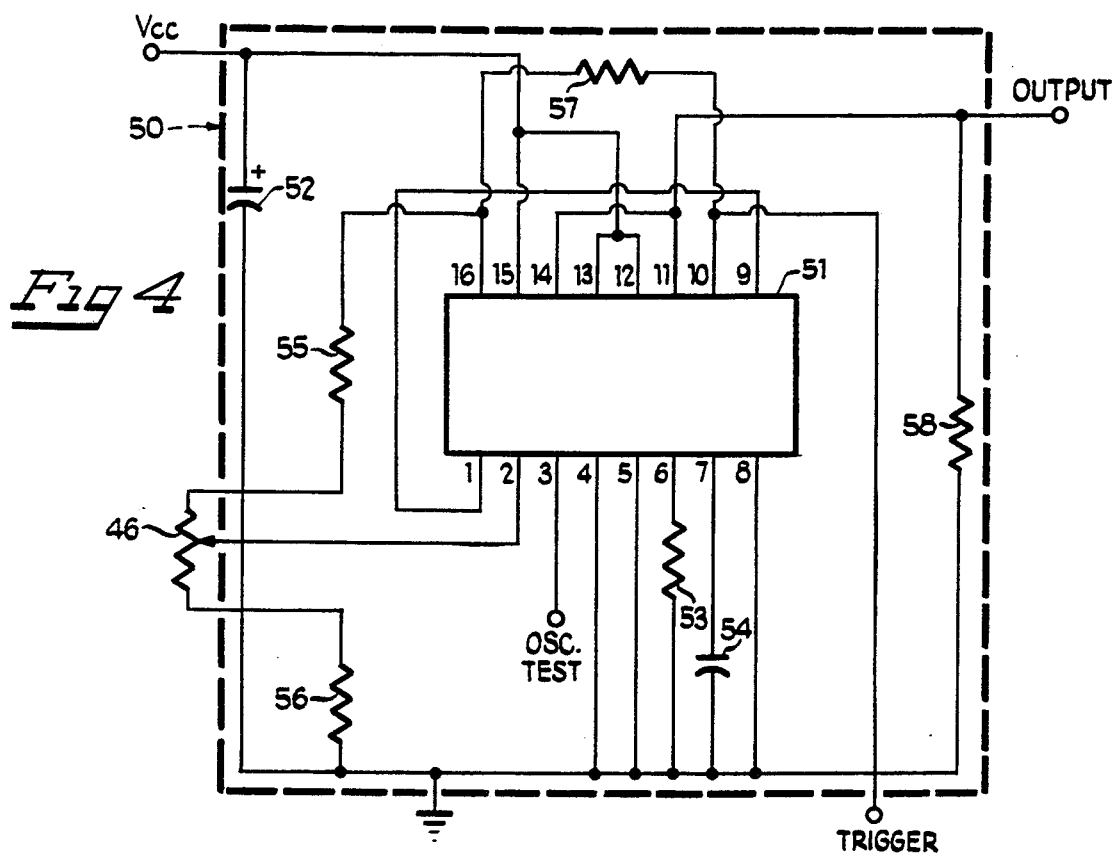
FIG. 4 is a schematic circuit diagram of the pulse width modulating driver of FIG. 3.

Referring now to FIG. 1, there is illustrated a MIG welding system, generally designated by the numeral 10, for welding together two workpieces 11. The system 10 includes a welding gun 12 which has a nozzle 13 in which is disposed a contact tip 14 guiding a consumable wire electrode 15 in electrical contact therewith, the electrode 15 being fed from an associated supply reel 16. A shielding gas, such as argon or carbon dioxide, is fed through the nozzle 13 for shielding the arc. The system 10 includes a DC power supply 20 in accordance with the present invention, which is connected across the electrode 15 and the workpieces 11 for striking an electrical arc therebetween, all in a known manner.

Referring to FIGS. 2 and 3, the DC power supply 20 includes a power transformer 21 having a primary winding 22 which is connected across an associated 120 VAC, 60 Hz, single-phase supply through an ON/OFF switch 23. While a 120 VAC supply is illustrated, it will be appreciated that the present invention could be used with other supply voltages with appropriate transformer design. The transformer 21 has a center-tapped secondary winding 24 across which are connected series-opposed rectifying diodes 25 provided with a suitable heat sink 26. There results a full wave rectified output with the positive at the junction between the cathodes of the diodes 25 and with the negative at the grounded center tap 27 of the secondary winding 24. It will be appreciated that a non-center-tapped secondary winding could also be used, but this would require four diodes in a bridge configuration to obtain full wave rectification.

A capacitor 28 is connected across the output of the rectifier for filtering the pulsating DC current and smoothing the ripple therein. Its value is chosen to support the welding voltage at whatever current output the power supply 20 is designed to deliver. An inductor 30 is connected in series with the positive rectifier output to delay the rise time of the main welding current at the initiation of the welding arc and provide a current slope that is compatible with the welding wire electrode metal and current used. As is indicated in FIG. 1, the positive output terminal is connected to the consumable wire electrode 15, while the negative terminal is connected to the workpieces 11. This negative connection is through a control circuit 40 to be described in greater detail below. A Schottky diode 31 or other fast recovery diode has its anode connected to the negative output terminal of the DC power supply 20 and its cathode connected to the positive rectifier output for a purpose to be explained more fully below, and is provided with a suitable heat sink 32.

The power transformer 21 is provided with an auxiliary winding 33, across which is connected a control supply circuit 35. More specifically, the terminals of the auxiliary winding 33 are connected to the AC terminals of a full wave rectifying diode bridge 36. The DC output of the bridge 36 is connected in parallel with a capacitor 37, which is used for filtering and reducing ripple. There results a DC supply voltage $V_{cc}$ which is supplied to a pulse width modulation ("PWM") circuit 45 for controlling the control circuit 40. It will be appreciated that the $V_{cc}$ supply voltage powers not only the PWM circuit 45, but also any other components needing low voltage DC power, such as the wire electrode drive or shielding gas solenoid (not shown).

Referring to FIG. 3, the control circuit 40 includes a parallel array of four N-channel power MOSFETs (metal oxide semiconductor field effect transistors) 41 and associated gate resistors 42, the transistors 41 sharing a common heat sink 43. The transistors 41 have their sources connected to the grounded center tap 27 of the transformer secondary winding 24 and their drains connected to the ground clamp of the workpiece 11. Thus, the transistors 41 share and carry the full-rated welding current through their source-drain junctions. While four of the transistors 41 are illustrated, it will be appreciated that other numbers could be used, the number of transistors 41 being a function of the output current rating of the welding system 10 and the temperature rise of the transistors under load. The power MOSFET transistors 41 divide the load fairly equally without additional series resistors or other balancing networks needed by bi-polar devices. While the control circuit 40 is connected in series with the negative welding lead, it could be connected in series with the positive lead, in which case P-channel MOSFETs would be used.

The transistors 41 are driven by the PWM circuit 45 which is connected to the gate resistors 42. The PWM circuit 45 includes a PWM driver 50 provided with an external heat control potentiometer 46. Referring to FIG. 4, the PWM driver 50 includes a commercially available integrated circuit regulating PWM module, such as a CA3524, but it will be appreciated that, if desired, the modulating functions could be obtained with discrete components. The $V_{cc}$ supply voltage from the control supply circuit 35 is applied to the IC module 51 at pins 12, 13 and 15. A filter capacitor 52 is connected across the $V_{cc}$ supply. A resistor 53 and a capacitor 54 are, respectively, connected to pins 6 and 7 to set the time constant of the modulator oscillator. The potentiometer 46 is connected in series with resistors 55 and 56 between ground and pin 16 of the module 51 to vary the output pulse width over the range set by the oscillator, to control the integrated weld current or "heat" of the welder. A resistor 57 is connected between pins 10 and 16 to set the bias for the trigger, which activates the oscillator when grounded by a trigger switch (not shown) on the welding gun 12. A bias resistor 58 is connected across the output of the PWM driver 50, which is taken at pins 11 and 14.

Figure 5:
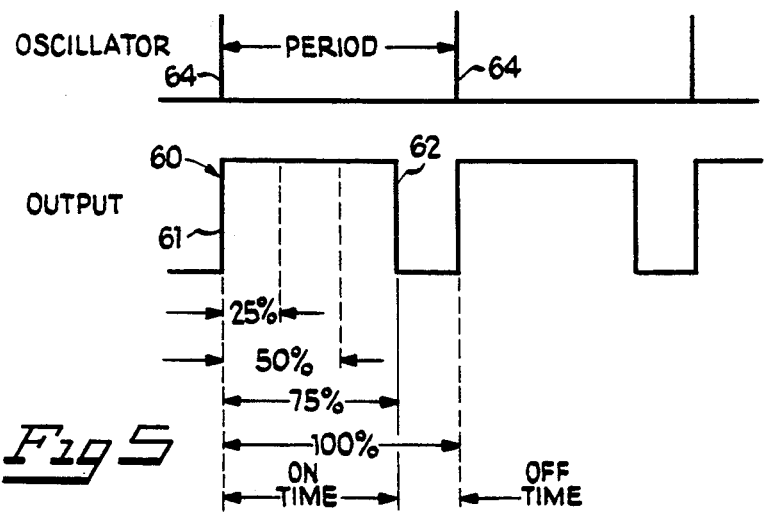
FIG. 5 is waveform diagram illustrating the oscillator and pulse-width-modulated control signal waveforms generated by the circuit of FIG. 4.

Referring also to FIG. 5, the oscillator of the IC module 51 produces clock pulses 64 to set the clock rate of the pulse width modulator. This oscillator frequency can be chosen to be optimized for the particular welding procedure desired. Most generally, for MIG welding applications, this frequency will fall in the range of from about 500 Hz to about 10 KHz, but is preferably between 500 Hz and 5 KHz. The oscillator output drives a pulse width modulator circuit which allows the output to be "on" for any portion of one cycle or period of the oscillator clock frequency. The output of the PWM driver 50 is a pulse width modulated square wave pulse train 60, having substantially vertical leading and trailing edges 61 and 62, respectively. In FIG. 5, the pulse is illustrated as being "on" for 75% of the oscillator clock period. Dotted lines indicate where the trailing edge 62 would fall if the heat control potentiometer 46 were set for 25%, 50% or 100% pulse width settings.

The MOSFET transistors 41 of the control circuit 40 respond to the PWM pulses by switching on and off in sync with the PWM pulse train 60. Thus, during the welding process, the main welding current will also be switched on and off at the PWM rate and duty cycle. There results essentially a unidirectional pulsed output current with a fixed peak voltage and an average current which is dependent on the pulse width modulator time base. The MOSFET transistors 41, in addition to being able to handle large volumes of current and being switchable at very high speeds, also have extremely high gains and can, therefore, be controlled with a very low-power PWM driver circuit 50. The Schottky diode 31 absorbs reflected voltage or current transients which may attempt to bias the transistors 41 in an ON condition during the OFF cycles of the PWM drive signal. This diode 31 must be an especially high speed type with a reverse recovery which is similar to that of the MOSFETs 41, in order to shunt these pulses from the very fast MOSFET transistor junctions.

Since the output welding current from the DC power supply 20 is pulsed, the pulse frequency can be advantageously chosen to enhance the arc characteristic during the welding process. The square wave form of the modulating signal with a substantially vertical leading edge providing a fast rising voltage wave front which produces a more stable arc that is easier to start than is the case with supplies which operate on a sinusoidal waveform. The relatively high frequency of the PWM drive signal is too fast for the arc to follow, thereby minimizing arc quenching between cycles of the voltage or current wave, even at low welding current settings. The PWM control of the welding current permits a continuous adjustment of the average current output between zero and full output, with a completely linear relationship between the output current and the control setting, and without affecting the peak voltage levels.

Because the welding current control is effected in the transformer secondary, no high frequency components need be provided in the primary. The transformer and its rectifiers function at the 60 Hz AC frequency rate, thereby permitting the use of standard conventional low cost components. It will be appreciated that in the DC power supply 20, the transformer primary can be left connected all the time and can, therefore, be controlled by a simple ON/OFF switch 23, and a separate control transformer for the trigger is obviated.

From the foregoing, it can be seen that there has been provided an improved DC power supply for a consumable electrode arc welder, which is of simple and economical construction and provides continuous linear control of the welding current without affecting peak voltage levels, and provides a stable, easily-started arc while substantially eliminating arc quenching.

We claim:

1. A power supply for causing an unregulated pulsed unidirectional welding current to flow in an arc between a workpiece and a consumable electrode in an arc welding system, said power supply comprising: a substantially constant potential power transformer having a primary winding adapted for connection to a source of AC power and a secondary winding, rectifying means coupled to said secondary winding for producing a DC current, and open-loop modulating means unresponsive to the arc coupled in series between said rectifying means and the arc for pulse width modulating the DC current to produce the pulsed welding current.

2. The power supply of claim 1, wherein said rectifying means includes means cooperating with said secondary winding to produce a full wave rectified current.

3. The power supply of claim 2, wherein said secondary winding has end terminals and a grounded center tap, said rectifying means including diodes respectively coupled to said end terminals of said secondary winding.

4. The power supply of claim 1, wherein said modulating means includes an integrated circuit modulator for producing a control signal, and switch means coupled to said rectifying means and to said modulator and responsive to the control signal for pulse width modulating the DC current.

5. The power supply of claim 4, and further comprising an auxiliary winding on said transformer, and rectifying means coupled to said auxiliary winding and to said modulator for producing a DC supply voltage for said modulator.

6. The power supply of claim 4, wherein said switch means includes field effect transistor means.

7. The power supply of claim 6, wherein said transistor means includes a plurality of metal oxide semiconductor field effect transistors connected in parallel between said modulator and the electrode.

8. The power supply of claim 1, and further comprising capacitor means connected across the output of said rectifying means and inductor means connected in series between said rectifying means and the electrode.

9. The power supply of claim 1, and further comprising means for selectively controlling the pulse width of the pulsed welding current.

10. The power supply of claim 1, wherein said modulating means has a pulse frequency in the range of from about 500 Hz. to about 10 KHz.

11. The power supply of claim 10, wherein said modulating means has a pulse frequency in the range of from about 500 Hz to about 5 KHz.

12. A power supply for causing an regulated pulsed unidirectional welding current to flow in an arc between a workpiece and a consumable electrode in an arc welding system, said power supply comprising a substantially constant potential source of DC power, switch means coupled between said source and the arc, and open loop driver means unresponsive to the arc for generating a pulse-width-modulated control signal, said switch means being coupled to said driver means and responsive to said control signal for pulse-width-modulating the DC power to produce the pulsed welding current.

13. The power supply of claim 12, wherein said switch means includes field effect transistor means.

14. The power supply of claim 13, wherein said transistor means includes a plurality of metal oxide semiconductor field effect transistors connected in parallel between said driver means and the electrode.

15. The power supply of claim 12, and further comprising trigger means for actuating said driver means.

16. The power supply of claim 12, and further comprising means for selectively controlling the pulse width of the control signal.

17. The power supply of claim 12, wherein said driver means includes means establishing a pulse frequency in the range of from about 500 Hz. to about 10 KHz.

18. The power supply of claim 17, wherein said modulating means has a pulse frequency in the range of from about 500 Hz to about 5 KHz.

19. The power supply of claim 17, and further comprising fast recovery diode means connected between the output of the source and the workpiece.

20. The power supply of claim 12, and further comprising capacitor means connected across the output of said source and inductor means connected in series between said source and the electrode.

* * * * *

UNITED STATES PATENT AND TRADEMARK OFFICE
CERTIFICATE OF CORRECTION

PATENT NO. : 5,357,078
DATED : October 18, 1994
INVENTOR(S) : Leonard S. Smith and Gary L. Cook It is certified that error appears in the above-indentified patent and that said Letters Patent is hereby corrected as shown below:

Column 6, line 32, "regulated" should be --unregulated--.

Signed and Sealed this

Twenty-seventh Day of December, 1994

Attest:

BRUCE LEHMAN

*Attesting Officer*  *Commissioner of Patents and Trademarks*